United States Patent
Funabashi

[11] Patent Number: 5,978,531
[45] Date of Patent: Nov. 2, 1999

[54] OPTICAL ISOLATOR AND OPTICAL AMPLIFIER WAVEGUIDE DEVICE

[75] Inventor: Masaaki Funabashi, Tokyo, Japan

[73] Assignee: NEC Corporation, Tokyo, Japan

[21] Appl. No.: 08/987,918

[22] Filed: Dec. 9, 1997

[30] Foreign Application Priority Data

Dec. 10, 1996 [JP] Japan ................................ 8-329427

[51] Int. Cl.$^6$ .................................................. G02B 6/26
[52] U.S. Cl. ............................... 385/45; 385/50; 385/37; 385/31
[58] Field of Search ................ 385/45, 50, 22, 385/24, 31, 44, 39, 49, 94, 27, 37

[56] References Cited

U.S. PATENT DOCUMENTS 5,732,170  3/1998  Okude et al. .............................. 385/27

FOREIGN PATENT DOCUMENTS 6-347665  12/1994  Japan .
8-313757  11/1996  Japan .

OTHER PUBLICATIONS

Japanese Office Action, dated Oct. 28, 1998, with English language translation of Japanese Examiner's comments.

*Primary Examiner*—Phan T. H. Palmer
*Attorney, Agent, or Firm*—Whitham, Curtis & Whitham

[57] ABSTRACT

It is the object of the invention to integrally conform functions of devices of optical fiber types with those of $SiO_2$ waveguides, miniaturize optical devices and provide optical waveguide devices with various optical functions. A $SiO_2$ waveguide, which is composed of a $SiO_2$ waveguide clad with low refractive index and a $SiO_2$ waveguide core with high refractive index, is formed on a Si substrate. The core and the clad on an area, where the direction of the core coincides with the orientation of crystallization of a Si substrate, are removed. A V-groove is formed along the orientation of crystallization of the exposed Si substrate. Both the end surfaces of an optical fiber grating, which is fitted in the V-groove, face those of the remaining $SiO_2$ waveguide. The cores of the $SiO_2$ waveguides and the optical fiber grating are optically coupled with each other.

16 Claims, 3 Drawing Sheets

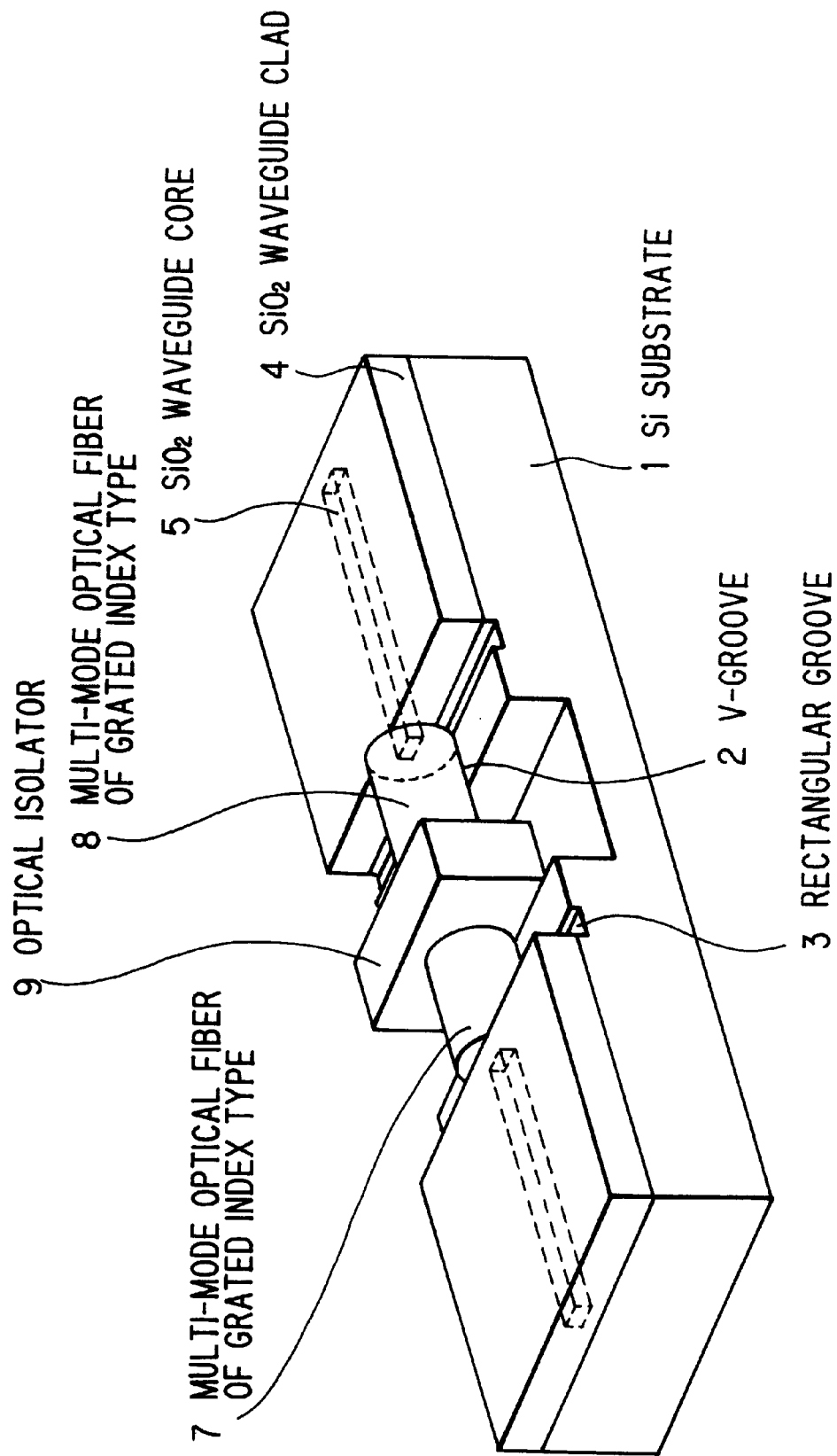

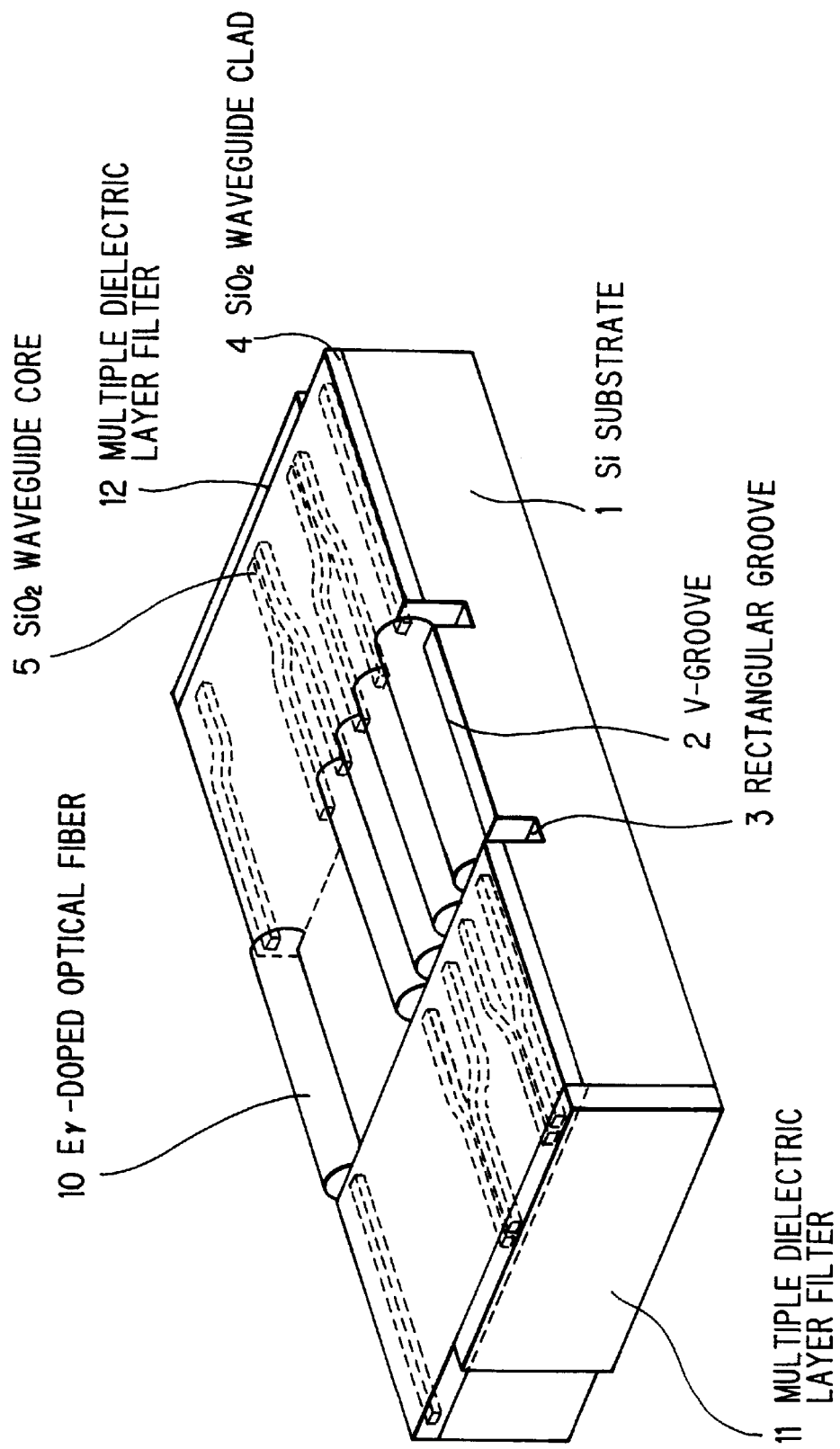

OPTICAL ISOLATOR AND OPTICAL AMPLIFIER WAVEGUIDE DEVICE

FIELD OF THE INVENTION

The invention relates to an optical waveguide device for optical communication, and especially to an optical waveguide device, in which an optical device of an optical fiber type is combined with optical waveguide circuits.

BACKGROUND OF THE INVENTION

An optical fiber grating (a fiber grating, hereinafter) has a property of reflecting optical signal with a particular wavelength propagating therethrough, and serves as an optical filter.

Conventionally, when the fiber grating is used in an optical circuitry, the fiber grating is connected with individual optical devices, such as a directional coupler, a Y-branch and etc., the fiber grating is connected with them via an optical fiber in most cases. Among the aforementioned optical devices, the Y-branch and the directional coupler can be fabricated from $SiO_2$ waveguides, but the characteristic of the fiber grating is better than that of a $SiO_2$ waveguide grating.

Moreover, the Er (erbium)-doped optical fiber is about several tens meters long and wound round a reel in most cases. The directional coupler or the Y-branch is connected with one end of the Er-doped fiber, and a pumping light with a wavelength of 1.48 $\mu$m or 0.98 $\mu$m is supplied thereto. An optical signal with the wavelength in 1.55 $\mu$m band is supplied from the other end of the Er-doped optical fiber. The aforementioned devices are connected with the end of the Er-doped fiber by means of arc fusion.

In the aforementioned devices, the directional coupler and the Y-branch can be fabricated from the $SiO_2$ waveguide, but the characteristic of the Er-doped fiber is better than that of an Er-doped $SiO_2$ waveguide.

In case that the fiber grating or the Er-doped fiber is used as an optical device, since they are connected with the directional coupler or the Y-branch by means of arc-fusion, fused portions must be reinforced after the work of arc fusion is over and become voluminous, hence miniaturization of this portion is difficult.

Moreover, the disadvantage of the optical device, such as the fiber grating, which suppresses the optical signal with a particular wavelength, is that its characteristic is changed by bending and stretching. On the other hand, in the $SiO_2$ waveguide, functions of splitting an optical signal and demultiplexing plural optical signals have been already completed, and technology for integrally realizing these functions have been established. However, in the $SiO_2$ waveguide, functions of amplifying and isolating the optical signal have not yet been realized.

As mentioned in the above, the devices of the fiber type and those of the $SiO_2$ type respectively have their own advantages, and are connected with each other via an optical fiber.

Accordingly, a troublesome job concerning with dealing with the remaining optical fiber is inevitable, and miniaturization of the connected portion becomes difficult.

SUMMARY OF THE INVENTION

Accordingly, it is an object of the invention to provide an optical filter of an optical waveguide type to overcome disadvantages of conventional technology, and integrally conform the functions of devices of an optical fiber type with those of the devices of $SiO_2$ waveguide type.

It is a further object of the invention to provide an optical isolator of an optical waveguide type to overcome disadvantages of conventional technology, and integrally conform the functions of devices of an optical fiber type with those of the devices of $SiO_2$ waveguide type.

It is a still further object of the invention to provide an optical amplifier of an optical waveguide type to overcome disadvantages of conventional technology, and integrally conform the functions of devices of an optical fiber type with those of the devices of $SiO_2$ waveguide type, According to the first feature of the invention, an optical waveguide device comprises:
- an optical waveguide formed on a substrate,
- a Y-branch of an optical waveguide type formed on the substrate, and,
- an optical fiber grating with a predetermined length set between the optical waveguide and the Y-branch,
- wherein both end surfaces of the optical fiber grating respectively face an end surfaces of a core of the optical waveguide and an end surface of a core of a trunk part of the Y-branch.

According to the second feature of the invention, an optical waveguide device comprises:
- two optical waveguide respectively formed on both side ends of a substrate,
- two multi-mode optical fibers of graded index type with equal predetermined lengths set in series between the two optical waveguides, and
- an optical isolator inserted between the two multi-mode optical fibers of graded index type,
- wherein cores of the optical waveguides, cores of the two multi-mode optical fibers of graded index type and the optical isolator are optically and successively connected.

According to the third feature of the invention, an optical waveguide device comprises:
- plural rare earth metal-doped optical fibers with a predetermined length arranged on a substrate,
- plural optical waveguide circuits respectively comprising optical band pass filters, which alternately connect ends of the plural rare earth metal doped optical fibers with those of the adjacent plural rare earth metal doped optical fibers to form a zigzag path for an optical signal supplied from a port of an input optical waveguide.

BRIEF DESCRIPTION OF THE DRAWINGS

The invention will be explained in more detail in conjunction with appended drawings, wherein:

FIG. 2 is a perspective view of the second preferred embodiment, in which an optical isolator is inserted between short pieces of multi-mode optical fibers of graded index type, and FIG. 3 is a perspective view of the third preferred embodiment of the invention, in which Er-doped optical fibers of short lengths are inserted between optical waveguides.

DESCRIPTION OF THE PREFERRED EMBODIMENTS

Figure 1:
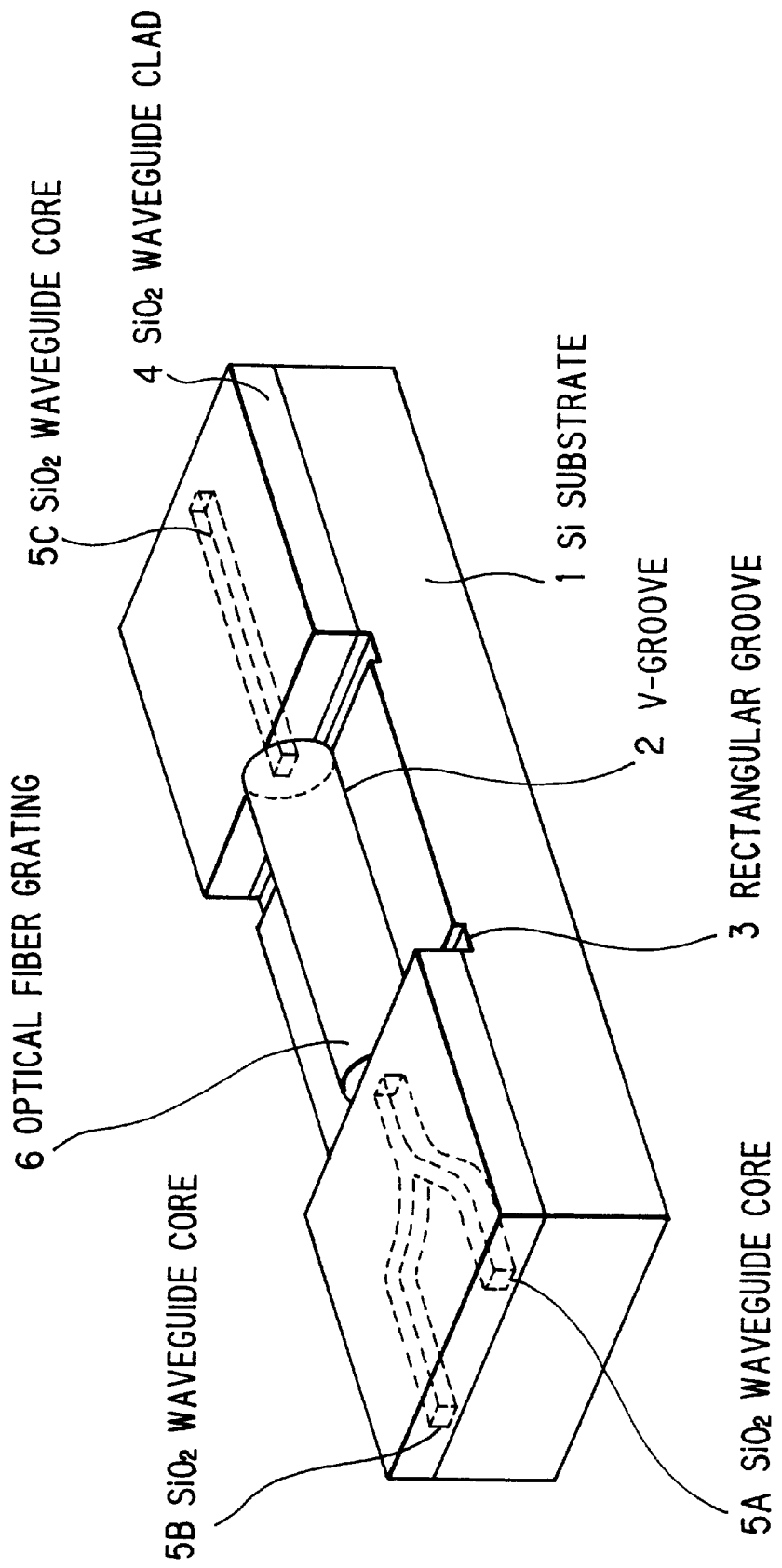
FIG. 1 is a perspective view of the first preferred embodiment of the invention, in which optical waveguides are combined with an optical fiber grating.

Next, three preferred embodiments of the invention will be explained referring to appended drawings.

First, the first preferred embodiment will be explained.

FIG. 1 shows a perspective view for showing the first preferred embodiment of the invention, which combines a fiber grating with $SiO_2$ waveguides.

A $SiO_2$ waveguide is formed on a Si substrate 1, then the central part of the $SiO_2$ waveguide is removed, and finally a V-groove 2 is formed on the exposed Si substrate. Moreover, an optical fiber grating 6 is fitted in the V-groove 2.

The process of fabrication of the structure shown in FIG. 1 comprises the steps of:
- depositing a mask for forming a V-groove on the central part of a Si substrate,
- forming the $SiO_2$ waveguide on the Si substrate,
- removing the $SiO_2$ waveguide at the central part of the Si substrate, on which the V-groove is to be formed,
- forming the V-groove by etching, and
- fitting an optical fiber grating in the V-groove.

First, a mask pattern necessary for etching the V-groove is formed on the Si substrate. The V-groove 2 is formed by wet etching.

The position of the mask necessary for forming V-groove 2 should be determined in consideration of that of the core of the $SiO_2$ waveguide, which will be formed in a later process.

The direction of the V-groove 2 should coincide with that of orientation of crystallization of Si, which constitutes the Si substrate.

The material of the mask necessary for forming the V-groove 2 is a heat-resisting metal withstanding temperature of nearly 1000° C., which can be formed by either spattering or evaporation.

Next, the $SiO_2$ waveguide is formed on the Si substrate 1. In this step, $SiO_2$ with low refractive index is deposited on the Si substrate 1, and $SiO_2$ with high refractive index is subsequently deposited thereon. A part of $SiO_2$ with high refractive index will be formed into the core of the $SiO_2$ waveguide in a later process. As the method for depositing $SiO_2$ layer, that of TEOS-CVD, flame hydrolysis deposit or spattering can be adopted.

In order to reform the deposited $SiO_2$ with high refractive index into the core of the $SiO_2$ waveguide, photolithography technology is adopted. That is to say, on the top surface of the $SiO_2$ layer with high refractive index, the mask is left behind by photolithography over a region, where the core of the $SiO_2$ waveguide is to be formed. In the area, which is not covered by the mask, the $SiO_2$ layer with high refractive index is removed by dry etching, such as reactive ion etching (RIE). The $SiO_2$ with low refractive index is again deposited in order to cover the $SiO_2$ region with high refractive index, which has been left behind in the aforementioned dry etching process. The aforementioned techniques are commonly used for fabricating the $SiO_2$ waveguide.

Next, the $SiO_2$ waveguide formed on the region, where the V-groove 2 is to be formed, is removed. First, the part of the $SiO_2$ waveguide, which is to be left behind, is masked by photolithography. Subsequently, the $SiO_2$ waveguide, which is not covered by the mask, is removed by reactive ion etching, and the surface of the Si substrate 1 is exposed.

Next, the V-groove 2 is formed by wet etching utilizing anisotropic property of Si. Explaining concretely, the surface of the Si substrate 1 is covered with a mask by photolithography, which withstand etchant for Si, such as water solution of KOH, except a region, where the V-groove 2 is to be formed. A thermally oxidized layer of Si can be used as a mask, but the metallic mask, which withstands high temperature, is used in the embodiment. As mentioned in the above, the mask has been formed before the $SiO_2$ waveguide is formed. Next, the V-groove 2 is etched by KOH solution with concentration of about 35 weight percent. The width of the V-groove 2 is determined in consideration of the height of $SiO_2$ waveguide core above the Si substrate 1. In this example of the embodiment, the $SiO_2$ waveguide core 15 μm high above the Si substrate 1, the diameter of the fiber grating 6 is 125 μm and the width of the V-groove 2 is 132 μm.

In boundary regions between the end surfaces of the Si substrate 1 and both the ends of the V-groove 2, rectangular grooves 3 are so formed by a dicing saw that they are perpendicular to the V-groove 2 in order to obtain their vertically processed end surfaces and remove unnecessary portions.

The fiber grating 6, which is fitted in the V-groove 2 and has a diameter of 125 μm, reflects 99% of an optical signal with a wavelength of 1.55 μm.

A nearly white light, which is supplied to the port of the $SiO_2$ waveguide core 5A in the optical device shown in FIG. 1, arrives at the input end of the fiber grating 6 via the Y-branch. A part of the incident light, which has wavelength of 1.55 μm, is reflected by the fiber grating. 50% of the reflected light returns to the port of the $SiO_2$ waveguide core 5A, and remaining 50% of that enters the port of a $SiO_2$ waveguide core 5B. Moreover, the other part of the incident light, which propagates through the fiber grating 6, enters the port of a $SiO_2$ waveguide core 5C.

Next, the second preferred embodiment of the invention will be explained.

FIG. 2 is a perspective view of the second preferred embodiment, in which an optical isolator is combined with optical waveguides. By a similar method to that in the case of FIG. 1, the $SiO_2$ waveguides are formed near both the ends of the V-groove 2. In other words, the central part of the $SiO_2$ waveguide formed by a Si substrate 1 is removed by etching, the Si substrate 1 is exposed and the V-groove 2 is formed thereon.

Next, in order to so form the end surfaces of the $SiO_2$ waveguide clads 4 and the $SiO_2$ waveguide cores 5 that they are smooth and perpendicular to the Si substrate 1, they are processed by a dicing saw.

A multi-mode optical fiber of graded index type is suitably divided into two parts 7 and 8, and they are respectively fitted into the V-groove 2. In this case, the end surfaces of the multi-mode fibers are so fixed that they face the end surfaces of the $SiO_2$ waveguide. An interval between the multi-mode fibers 7 and 8 is several mm. The refractive index of the multi-mode fibers 7 and 8 is represented by a decreasing parabolic function in the radial direction, and they serve as collimator lenses by suitably selecting their lengths. Accordingly, a ray of light focused on the optical isolator 9 by the multi-mode fiber of graded index type 7 is again focused on the input end of the $SiO_2$ waveguide core 5 by the multi-mode optical fiber of graded index type 8, and an optical loss therebetween can be decreased.

In this embodiment of the invention, an optical isolator 9 is allocated between the multi-mode fibers 7 and 8.

Next, the third preferred embodiments will be explained.

FIG. 3 is a perspective view for showing the third preferred embodiment, which is fabricated by combining an Er-doped optical fiber with $SiO_2$ waveguide.

$SiO_2$ waveguides are formed near both the ends of V-grooves 2 by a method similar to that used in the case of FIG. 1. That is to say, the central parts of the $SiO_2$ waveguides formed on a Si substrate 1 are removed by etching, and the Si substrate 1 is exposed, and a V-grooves 2 are formed thereon.

Next, in order to so form the end surfaces of the $SiO_2$ waveguide cores 5 that they are smooth and perpendicular to the Si substrate 1, they are processed by a dicing saw.

The $SiO_2$ waveguides near both the ends of the V-grooves 2 are formed in parallel with the longitudinal direction of the V-grooves 2 at a pitch of 130 μm. The $SiO_2$ waveguide becomes closer to the neighboring one, as they are remote from the V-grooves 2, and an optical power propagating through the $SiO_2$ waveguide shifts to the neighboring one. The $SiO_2$ waveguides are so designed that 50% of the optical power propagating through the $SiO_2$ waveguide shifts to the neighboring one, when they arrive at their end surfaces.

Multiple dielectric layer filters 11–12 are stuck to the end surfaces of the $SiO_2$ waveguides and reflect only the optical signals of a predetermined wavelength. The optical signal is reflected by the end surface of the $SiO_2$ waveguide and propagates through the same $SiO_2$ waveguide in the opposite direction. The optical power propagating in the opposite direction subsequently shifts to the neighboring $SiO_2$ waveguide, till 100% of the initial optical powers shifts thereto.

The neighboring $SiO_2$ waveguides are so designed that the optical signal propagates along a zigzag path and passes through all of the Er-doped fibers arranged on the V-grooves 2.

That is to say, the incident optical signal is supplied to the Er-doped fiber 10 via the $SiO_2$ waveguide core. The optical signal transmitted through the Er-dope fiber 10 is supplied to the other $SiO_2$ waveguide core, reflected by the multiple dielectric layer filters 11 and 12 and supplied to the next Er-doped optical fiber 10. The optical signal passes through the plural Er-doped fibers 10, repeatedly going and returning, and is emitted from the output end of the $SiO_2$ waveguide.

The multiple dielectric layer filters 11 and 12 reflects only the optical signal with a particular wavelength, and consequently suppresses degrade of S/N ratio, which is caused by spontaneous emission in the step of light amplification.

As mentioned in the above, the effects of the invention can be summarized as follows.

(1) The optical device can be miniaturized by optically combining the optical fiber core with the $SiO_2$ waveguide core.

(2) The optical fiber can be realized by integrally combining the filter characteristic of the optical fiber grating with Y-branch of the $SiO_2$ waveguide type.

(3) If the two pieces of the multi-mode optical fiber of graded index type are used as the collimator lenses, various optical functions can be realized by setting the optical isolator, the optical band pass filter and a wavelength plate between the aforementioned collimator lenses.

(4) The optical amplifier can be realized by integrally combining the light-amplifying function of the Er-doped fiber with the directional coupler of the $SiO_2$ waveguides type.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical waveguide device comprising:

an $SiO_2$ optical waveguide formed on a substrate, a Y-branch of an optical waveguide type formed on said substrate, and, an optical fiber grating with a predetermined length set between said optical waveguide and said Y-branch, wherein both end surfaces of said optical fiber grating respectively face an end surface of a core of said optical waveguide and an end surface of a core of a trunk part of said Y-branch.

2. An optical waveguide device according to claim 1, wherein:

said optical waveguide and said Y-branch are respectively composed of cores of high refractive index and clads with low refractive index, and optical axis of said cores of said optical waveguide and said trunk part are aligned along a same line.

3. An optical waveguide device comprising:

an optical waveguide formed on a substrate;

a Y-branch of an optical waveguide type formed on said substrate, wherein said optical waveguide and said Y-branch are respectively composed of cores of high refractive index and clads with low refractive index, and optical axis of said cores of said optical waveguide and said trunk part are aligned along a same line;

an optical fiber grating with a predetermined length set between said optical waveguide and said Y-branch, wherein said optical fiber grating is fitted in a V-groove formed on said substrate, and an optical axis of said optical fiber grating coincides with said same line;

wherein both end surfaces of said optical fiber grating respectively face an end surface of a core of said optical waveguide and an end surface of a core of a trunk part of said Y-branch.

4. An optical waveguide device comprising:

two optical waveguide respectively formed on both side ends of a substrate, two multi-mode optical fibers of graded index type with equal predetermined lengths set in series between said two optical waveguides, and an optical isolator inserted between said two multi-mode optical fibers of graded index type, wherein cores of said optical waveguides, cores of said two multi-mode optical fibers of graded index type and said optical isolator are optically and successively connected.

5. An optical waveguide device according to claim 4, wherein:

optical axes of said two optical waveguides, said two multi-mode fibers of graded index type and said optical isolator are aligned along a same line.

6. An optical waveguide device according to claim 5, wherein:

each of said two multi-mode fibers of graded index type serves as a collimator lens.

7. An optical waveguide device according to claim 5, wherein:

said two multi-mode optical fibers are respectively set on two V-grooves formed on said semiconductor substrate.

8. An optical waveguide device comprising:

plural rare earth metal-doped optical fibers with a predetermined length arranged on a substrate, plural optical waveguide circuits respectively comprising optical band pass filters, which alternately connect ends of said plural rare earth metal doped optical fibers with those of said adjacent plural rare earth metal doped optical fibers to form a zigzag path for an optical signal supplied from a port of an input optical waveguide.

9. An optical waveguide device according to claim 8, wherein:

said rare earth metal doped optical fibers are arranged on a rectangular area on said substrate, and run in parallel with each other at a predetermined pitch.

10. An optical waveguide device according to claim 9, wherein:

an optical axis of each of optical waveguides composing said optical waveguide circuits is aligned with said corresponding rare earth metal doped optical fiber.

11. An optical waveguide device according to claim 8, wherein:

each of said optical waveguide circuits is composed of a pair of optical waveguides running in parallel with each other, which is composed of a first part and a second part, said first part being composed of said pair of said optical waveguides remoted from each other and said second part being composed of said pair of said optical waveguides approximated to and optically coupled with each other, wherein, a terminal end of said second part is terminated by an optical band pass filter for passing said optical signal.

12. An optical waveguide device according to claim 11, wherein:

said optical band pass filter is composed of multiple dielectric layers.

13. An optical waveguide device according to claim 8, wherein;

said rare earth metal is erbium.

14. An optical waveguide device comprising:

a substrate having first to third surfaces;

a Y-branch waveguide formed on said first surface of said substrate, said Y-branch waveguide having first and second ports positioned on a side opposite to a first boundary between said first and second surfaces of said substrate, and a third port positioned at said first boundary;

a non-branch waveguide formed on said third surface of said substrate, said non-branch waveguide having a first port positioned at a second boundary between said second and third surfaces of said substrate, and a second port positioned on a side opposite to said second boundary;

an optical fiber grating of a predetermined length provided on said second surface of said substrate, said optical fiber grating having a first end optically coupled to said third port of said Y-branch waveguide, and a second end optically coupled to said first port of said non-branch waveguide.

15. An optical waveguide device according to claim 14, wherein:

said second surface of said substrate is formed with a V-groove into which said optical fiber grating is set.

16. An optical waveguide device according to claim 14, wherein:

said second surface of said substrate is formed with rectangle grooves along said first and second boundaries.

* * * * *